United States Patent [19]

McAndrew

[11] 4,164,233
[45] Aug. 14, 1979

[54] VEHICLE COVERING APPARATUS

[76] Inventor: James R. McAndrew, 3960 Government St., Baton Rouge, La. 70806

[21] Appl. No.: 884,281

[22] Filed: Mar. 7, 1978

[51] Int. Cl.² ............................................. A45F 1/14
[52] U.S. Cl. ................................ 135/5 A; 135/15 LF; 296/136
[58] Field of Search ............ 135/5 A, 4 A, 3 A, 1 A, 135/7.1 A, 15 CF; 296/136

[56] References Cited

U.S. PATENT DOCUMENTS

| | | | |
|---|---|---|---|
| 1,471,279 | 10/1923 | Raggis | 135/1 A |
| 2,508,757 | 5/1950 | Gray | 135/5 A |

FOREIGN PATENT DOCUMENTS

| | | | |
|---|---|---|---|
| 290403 | 11/1965 | Australia | 135/1 A |
| 290384 | 3/1966 | Australia | 135/1 A |
| 149618 | 4/1955 | Denmark | 135/5 A |
| 111047 | 4/1967 | Norway | 135/1 A |

Primary Examiner—Benjamin W. Wyche
Assistant Examiner—Conrad L. Berman
Attorney, Agent, or Firm—Roy, Kiesel, Patterson & Abadie

[57] ABSTRACT

A portable device for covering vehicles comprising attaching clamps for connecting to the front and rear of the vehicle, extendable rods attached at one end to the clamps and extending above the vehicle, and a waterproof covering extendable over the vehicle and attachable in a fixed position at either end to the rods.

5 Claims, 5 Drawing Figures

VEHICLE COVERING APPARATUS

BACKGROUND OF THE INVENTION

1. Field of the Invention

This invention relates broadly to covering devices and, more particularly, to a removable, portable device for covering a vehicle.

2. Prior Art

The bleaching by the sun of paint color on vehicles has long been a problem, and has become particularly critical today with more vehicles and fewer covered parking areas. Many and varied products have been designed which can provide a covering. Some of these products are even portable, such as that discovered in U.S. Pat. No. 2,262,129. However, problems still exist with regard to ease of assembly and attachment to the vehicle, storage space required and adaptability of one model design to the many varied sizes and shaped vehicles.

SUMMARY OF THE INVENTION

Therefore, one object of this invention is to provide a vehicle covering which is compact, easily attachable and adaptable to a variety of shaped and sized vehicles.

Other advantages and objects of this invention shall become apparent from the ensuing descriptions of this invention.

Accordingly, a vehicle cover is provided comprising attaching clamps for connecting to the front and rear of the vehicle, extendable rods attached at one end to the clamps and extending above the vehicles, and a waterproof covering extendable over the vehicle and attachable in a fixed position at either end to the rods.

PREFERRED EMBODIMENTS OF THE INVENTION.

Figure 1:
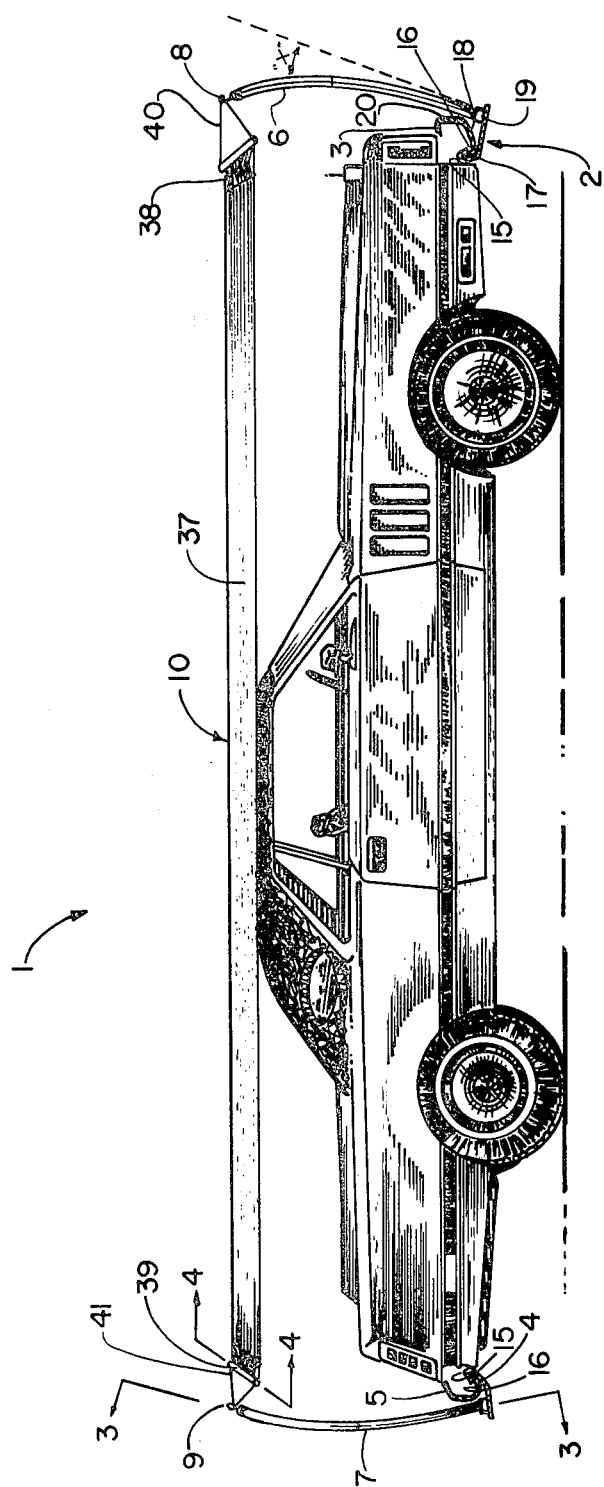
FIG. 1 is a perspective view illustrating a preferred embodiment of this invention used with an automobile.

Referring to FIG. 1, a preferred embodiment of the portable vehicle cover, denoted generally by the numeral 1, is illustrated having front attaching clamp 2 connected to front car bumper 3, rear attaching clamp 4 connecting to rear car bumper 5, front rod 6 and rear rod 7 each having hook means 8, 9, respectively, to which is attached car cover assembly 10.

Figure 2A:
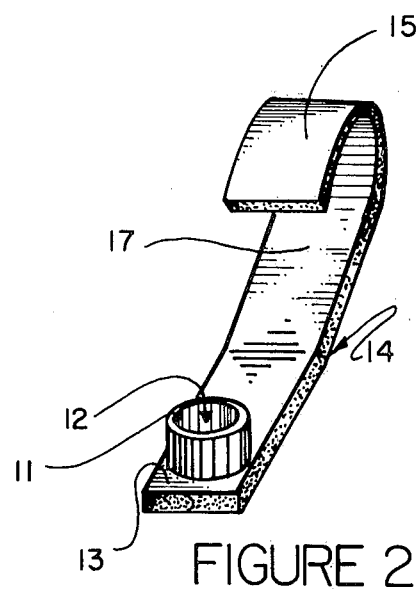
FIG. 2A is a perspective view of a preferred embodiment of the attaching clamps.

In one embodiment of the attaching clamps illustrated in FIG. 2A, it comprises a rod holding cup 11, being a circular piece of pipe having a center cavity 12 for receiving rods 6 or 7. Cup 11 is attached, such as by welding 12, to surface 13 of attaching bar member 14. Bar member 14 is provided with a J-shaped curved section 15 which forms a hook-shaped end that fits over the rear lip 16 of the car bumper 3 or 4. In a preferred feature, bar member 14 has flat section 17 that extends down below and past bumper end 18 and has a second section 19 angled upward from the end of section 17 so that cup 11 is directed more upward to form a smaller angle "X" with front bumper section 20. In this embodiment, it is preferred that cup 11 not be perpendicular to the ground but at least at an angle of 10° or, more preferably, 10°–30° in order to better secure rod 6 or 7 when cover assembly 10 is in place.

Figure 2B:
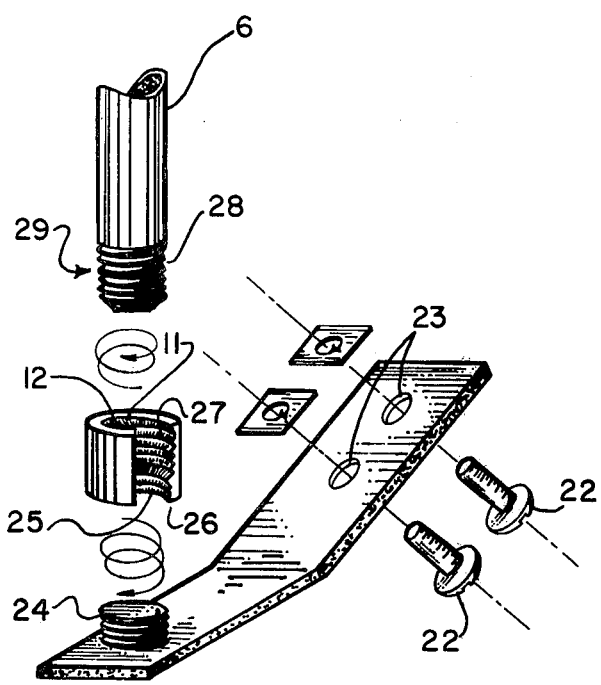
FIG. 2B is an alternate preferred embodiment of the attaching clamp.

In alternate embodiments illustrated in FIG. 2B, the attaching clamp is connected to car bumer 3 or 4 by a bolting arrangement comprising bolts 22 passing through openings 23 and into corresponding openings (not shown) in car bumper 3 or 5. This arrangement allows the clamps to be retained on the car after the rods and cover are removed without danger of falling off if the car is moved. In another preferred feature, threaded stud 24 is attached to the other end 25 of the clamp and cup 11 has a threaded cavity 25 in its bottom end 26 which screws onto stud 24. In still another preferred embodiment, cavity 12 has threaded side walls 27 and rods 6 and 7 are each provided with mating threads 28 at their lower end 29 for screwing into cavity 12.

Figure 3:
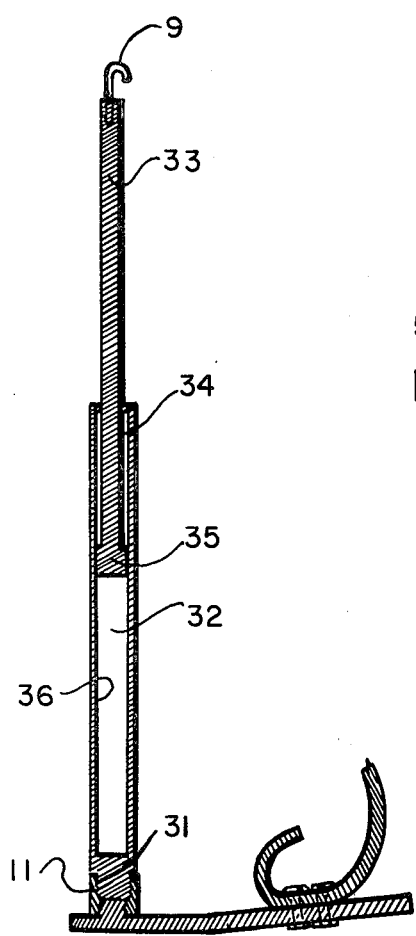
FIG. 3 is a cross-sectional view taken along lines 3—3 of FIG. 1.

In another preferred embodiment, rods 6 and 7 are constructed of flexible material, such as fiberglas, to allow them to bend when under strain such as when covering 10 is attached. This feature will insure proper positioning and attachment of the covering. In still another preferred feature, each rod will be constructed from multiple sections which telescope into one another. As shown in FIG. 3, the base section 30 has end 31 which screws into cup 11 and is provided with a cental hollow cavity 32 into which upper section 33 can slide. To prevent section 33 from being pulled out of cavity 32, section 30 has a blocking ring 34 at its upper end which extends inward into cavity 32 and section 33 has a mating blocking ring 35 which extends outward to contact cavity wall 36. Thus, with this telescoping arrangements, rods 6 or 7 can be extended to the desired height depending upon the type of vehicle being covered and can be compacted for easier storage when not in use.

Figure 4:
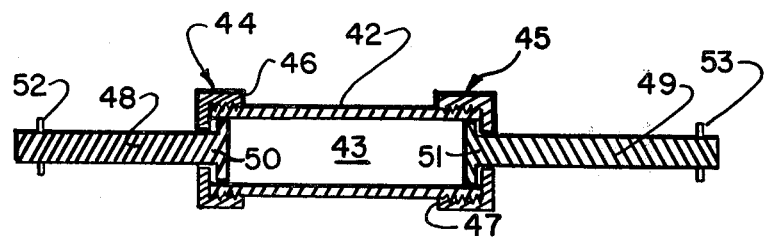
FIG. 4 is a cross-sectional view taken along lines 4—4 of FIG. 1.

Cover assembly 10 preferably comprises an opaque, waterproof cover 37 that is connected at each end to extension bars 38, 39, which in turn are connected to rods 6 and 7, respectively, by cords 40, 41, respectively, as shown. In a preferred feature as shown in FIG. 4, the extension bars comprise a center brace 42 having a central hollow cavity 43 extending through brace 42 with blocking rings 44, 45 at each end. In a more preferred embodiment, blocking rings 44, 45 having threaded shoulder sections 46, 47, respectively, for screwing onto the ends of center brace 42. End braces 48, 49 are rod members which can fit into cavity 43 at either end and each having stop means 50, 51, respectively, at one end to prevent them from being pulled out of cavity 43. In still another preferred embodiment, tying posts 52, 53 are provided at opposite ends of braces 48, 49, respectively, to facilitate securing cords 41, 40, respectively.

In operation, attaching clamps 2 and 4 are attached to the vehicle bumpers 3 and 5. Next, rods 6 and 7 are secured into clamp cups 11 and extended to the desired height. Finally, the cover assembly 10 is attached to each rod by connecting cover 37 at each end to the extension bars and the extension bars being connected to hook means 8 and 9. After being connected, extension bars can then be extended to the desired width.

There are, of course, many obvious variations and other modifications to the specific disclosures herein which are intended to be included within the scope of the following claims.

What I claim is:

1. A portable device for covering vehicles comprising:
   (a) attaching clamps connected to front and rear bumpers of said vehicle,
   (b) rods attached to each of said clamps and extending above said vehicle, and
   (c) an opaque covering assembly attached at each end of said rods above said vehicle, said covering assembly comprising an opaque, waterproof covering attached at each end to extension bars, said extension bars comprising a center brace having a central hollow cavity extending through said brace, blocking rings attached at each end of said brace and extending into said central hollow cavity, end braces fitting into each end of said central hollow cavity and extendable out therefrom, each end brace having stop means contactable to said blocking rings to prevent said end braces from being pulled from said central hollow cavity.

2. A device according to claim 1 wherein said blocking rings having threaded shoulder sections which can be screwed onto threaded end sections located at opposite ends of said center brace.

3. A device according to claim 1 wherein said rods are constructed from flexible materials to allow said rods to bend under stress.

4. A portable device for covering vehicles comprising:
   (a) attaching clamps connected to front and rear bumpers of said vehicle, said attaching clamps each comprising:
      (i) a first flat end section to which a cup means having a center cavity of sufficient size to receive one end of one of said rods, and
      (ii) a second flat end section connected to said first section at an angle upward toward said cup, said second section having openings to receive bolts which attach said clamp to said bumper and being of sufficient length to extend outward beyond said bumper.
   (b) rods attached to each of said clamps and extending above said vehicle, and
   (c) an opaque covering assembly attached at each end to said rods above said vehicle.

5. A device according to claim 4 wherein said rods are constructed from flexible material to allow said rods to bend under stress.

* * * * *